Patented Feb. 11, 1941

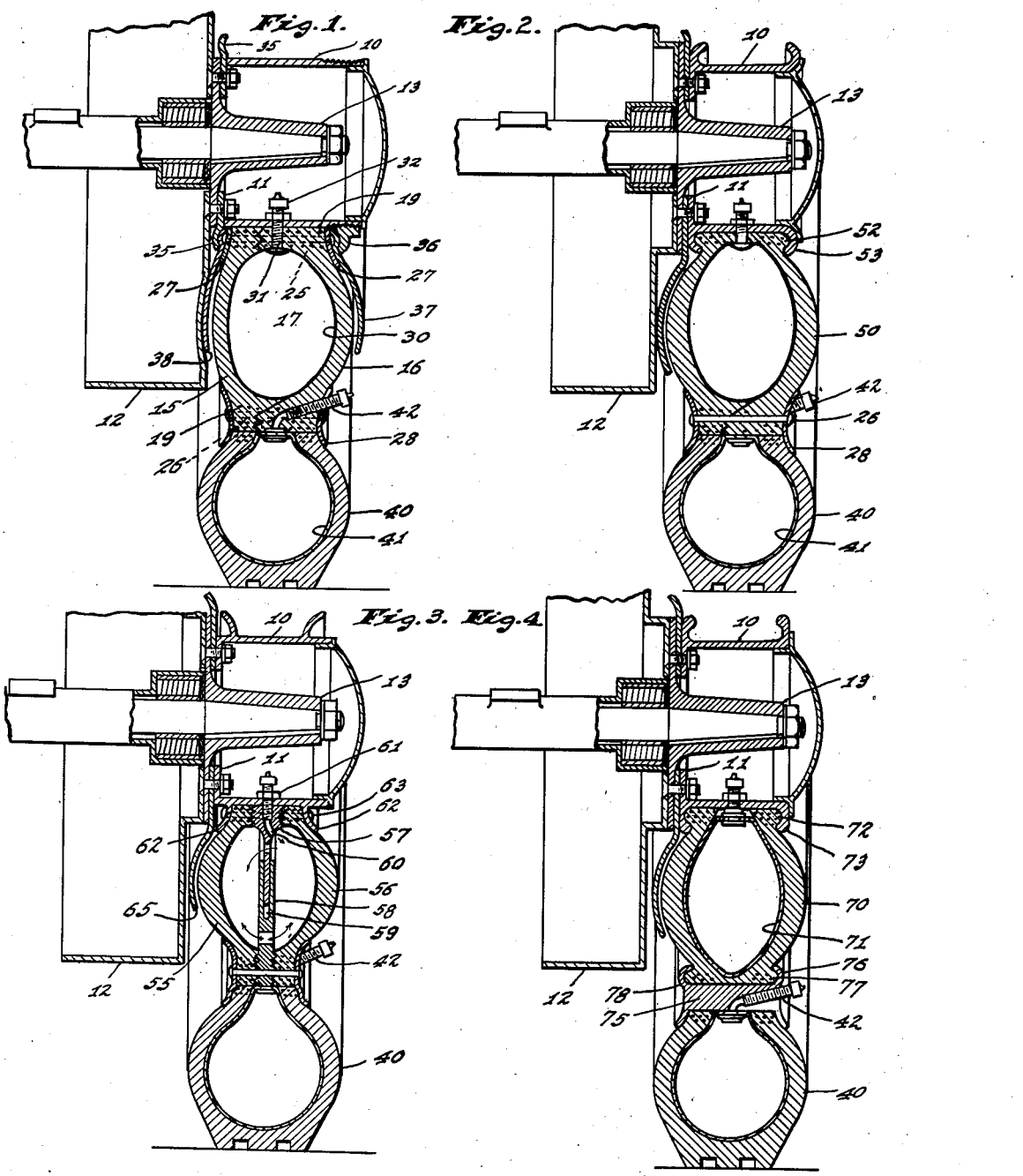

2,231,745

UNITED STATES PATENT OFFICE 2,231,745

VEHICLE WHEEL

John W. Altmyer, Omaha, Nebr.

Application January 27, 1937, Serial No. 122,504

1 Claim. (Cl. 152—9)

My invention relates to vehicle wheels, and has for its object the provision of a vehicle wheel which will possess more resilience than wheels now in use and which will therefore possess materially enhanced riding qualities. More specifically, it is my object to produce a wheel which will possess inherent resilient properties additive to those possessed by the usual pneumatic tire.

In carrying out my objects, I form the wheel on a sleeve which is adapted to be attached to any desired form of wheel-hub, the body of the wheel comprising an annular air chamber formed with resilient walls and equipped with provisions for attachment of the usual pneumatic tire.

Means are provided for maintaining air under pressure in the annular chamber constituting the body of the wheel, so that the inherent resilience of the wheel will be added to that of the tire to give easy riding qualities to the vehicle. In certain modifications of my invention, the wheel is provided with means for eliminating or materially reducing the possibility of side sway and for preventing complete collapse of the wheel-body should the air escape therefrom as the result of an accident.

The accompanying drawing illustrates my invention, the four figures being axial sections through wheels of different types of construction.

In all the arrangements illustrated, the wheel comprises an inner sleeve 10 provided with an annular flange 11 adapted to be secured to the brake-drum 12 of the wheel-hub 13 or, in the absence of a brake-drum, to a similar flange on the hub.

In the arrangement illustrated in Fig. 1, the body of the wheel is formed of two parts 15 and 16 so shaped that when brought together they will define an annular air chamber 17. The two parts 15 and 16 are formed of rubber reinforced throughout their complete extent with fabric or cord and near their edges with wires 19, all in accordance with the general principles followed in the construction of pneumatic-tire casings. The interengaging portions of the two parts 15 and 16 are desirably formed with mating, angularly extending tongue-and-groove joints to hold the two parts in proper relative position and also to aid in preventing the escape of air.

The two parts 15 and 16 are held together, desirably by means of rivets 25 and 26 which extend between pairs of rings 27—27 and 28—28 located on opposite sides of the wheel-body. If the parts 15 and 16 are reinforced with cords, after the manner of the ordinary cord tire, some of the cords desirably embrace the holes through which the bolts 25—26 pass. With the two parts 15 and 16 so secured together, they are subjected to a vulcanization process to seal the joints between them.

To aid in the prevention of the escape of air, the annular chamber 17 may be lined with rubber 30 which overlaps the joints between the two parts 15 and 16 and which is vulcanized in place during the vulcanization process above referred to. An air-inlet tube 31 extends radially through the base of one of the parts 15 and 16 and into the interior of the sleeve 10 where it may be provided with a valve and valve-cap 32 similar to that used in the ordinary automobile tire.

The wheel body formed as described may be held in place on the sleeve 10 in any desired fashion. As shown in Fig. 1, the wheel-body is held in place by being clamped between a flange 35 and a collar 36, the latter screw-threadedly mounted on the sleeve 10. If desired, there may be interposed between the ring 27 and collar 36 an annular shield 37 which extends radially outward along the side of the part 16, desirably in spaced relation thereto. The shield 37 not only tends to protect the wheel-body from injury, but also provides support tending to prevent excessive side sway. If desired, a similar shield 38 may be provided on the inner face of the wheel-body.

In the arrangement illustrated in Fig. 1, the parts 15 and 16 are not of the same shape, the part 15 being shown as having a straighter side wall than the part 16. This is done for the purpose of providing room for the brake-drum.

The rings 28 at the outside of the wheel-body project radially outward beyond the limits thereof, their outer edges forming flanges for the retention of a tire casing 40, of the conventional type. Within the tire casing 40 is located an inner tube 41 having a stem 42 through which it may be filled with air under pressure. The arrangement of the tire-casing 40 and tube 41 may be conventional except that the stem 42 is brought obliquely outward through the base of the wheel-body part 16 and through the outer ring 28, where it will be accessible for attachment to a filling hose.

In the arrangement illustrated in Fig. 2 the wheel-body 50, instead of being formed in two parts, is formed in a single part continuous at its interior and divided at its exterior. The interengaging portions at the sides of the division in the exterior portion of the wheel body are formed with annular tongue-and-groove joints and are held together by vulcanization and rivets 26 and rings 28 similar to those employed in the arrangement shown in Fig. 1.

The wheel-body 50, instead of being clamped in place on the sleeve 10, is retained thereon by being provided with flanges 52 of the clincher type which are held in place by complementary flanges 53 on the sleeve 10. As indicated in Fig. 2, the air cavity in the body 50 desirably extends inwardly of the wheel to overlap radially the flanges 53. By virtue of this arrangement the air pressure within the wheel-body 50 aids in retaining the flanges 52 and 53 in engagement.

The arrangement illustrated in Fig. 3 is generally similar to that shown in Fig. 1, the wheel-body being formed of two parts 55 and 56. Interposed between these parts, however, are interfitting guides 57 and 58 of rigid material, such as metal. The outermost guide 58 is provided with a relatively deep inwardly opening annular groove which slidably receives the guide 57. The outer diameter of the guide 57 is somewhat less than the diameter of the bottom of the groove in the guide 58, so that normally there exists a space 59 which permits relative radial movement of the two guides.

The air-inlet passage 60 for the wheel-body illustrated in Fig. 3 is conveniently provided in the base of the guide 57 and communicates with a valve-fitting 61 extending into the interior of the sleeve 10.

Instead of making the wheel-body 55—56 shown in Fig. 3 readily removable from its associated sleeve 10, I permanently attach it to such sleeve, as by providing the sleeve with spaced outwardly projecting flanges 62 between which the base of the wheel-body is received. Rivets 63 extending through the flanges 62 and the base of the wheel-body serve to hold it in place. Tongue-and-groove joints at the points where the wheel-body parts 55—56 engage the guides 57 and 58 aid in providing an effective seal preventing the escape of air. A lining 65 of asbestos or other heat-insulating material may be provided between the brake-drum 12 and the inner wheel-body part 55 to retard the transmission of heat from the brake-drum to the wheel-body; and the brake-drum 12 may be shaped to conform generally to the inner wheel-body part 55.

The arrangement illustrated in Fig. 4 is much like that shown in Fig. 2 except that the single-piece wheel-body 70 is provided with a removable inner tube 71, the stem of which extends through the wall of the sleeve 10 into the interior thereof. The wheel-body is held in place on the sleeve 10 by interfitting clincher flanges 72 and 73.

Instead of seating the base of the tire 40 directly upon the resilient material of the wheel-body, as is done in the arrangements illustrated in Figs. 1 to 3 inclusive, the arrangement shown in Fig. 4 includes an interposed ring 75 which is held in place on the wheel-body by interfitting clincher flanges 76 and 77 and which is provided on its outer face with annular flanges 78 between which the base of the tire-casing 40 is received. As shown, the ring 75 is slotted for the reception of the stem 42 of the inner tube 41 in the casing 40. The cavity within the body 70 preferably extends radially outward beyond the inner edges of the flanges 76 so that air pressure within the body aids in holding the flanges 76 and 77 in engagement.

In all the modifications illustrated the body of the wheel is resilient in itself and adds its resilience to that possessed by the conventional tire. This arrangement greatly improves the riding qualities of a vehicle equipped with wheels in accordance with my invention. Any tendency toward side-sway which the wheel-body possesses may be counteracted either by such supporting flanges as those indicated at 37 and 38 in Fig. 1 or by the use of interfitting guides 57 and 58 of Fig. 3. The latter arrangement possesses an additional advantage in that should the air escape from the wheel-body as the result of injury, the radial collapse of the wheel-body is limited by engagement of the outer edge of the guide 57 with the bottom of the groove in the guide 58.

I claim as my invention:

A vehicle wheel, comprising a central sleeve, a hollow annular wheel-body of resilient material mounted on said sleeve, said body being formed in two parts lying on opposite sides of a medial plane, co-operating guides secured between said body parts at the inner and outer sides thereof, respectively, the inner one of said guides being provided with an air admission passage, and rings secured to opposite sides of said body and projecting radially beyond the periphery thereof, said rings and the peripheral portion of said resilient body forming a seat for the reception of the casing of a pneumatic tire.

JOHN W. ALTMYER.